Jan. 6, 1970  G. SWIFT  3,487,681
METHOD AND APPARATUS FOR RESOLVING WELL LOGS
Filed Jan. 14, 1965  3 Sheets-Sheet 1

INVENTOR.
GILBERT SWIFT
BY
ATTORNEY

INVENTOR.
GILBERT SWIFT
BY
ATTORNEY

United States Patent Office 3,487,681
Patented Jan. 6, 1970

3,487,681
METHOD AND APPARATUS FOR RESOLVING WELL LOGS
Gilbert Swift, Houston, Tex., assignor to Dresser Industries, Inc., Dallas, Tex., a corporation of Delaware
Filed Jan. 14, 1965, Ser. No. 425,637
Int. Cl. E21b 47/12
U.S. Cl. 73—152    12 Claims

ABSTRACT OF THE DISCLOSURE

A system having a pair of endless recording channels is used to record the electrical signals from a pair of logging channels. Each of the recording channels has a recording and playback transducer. Circuit means provide a minimizing of the intergrated difference between the electrical signals in the two channels for a given depth in a borehole.

---

The present invention relates to the art of geophysical prospecting for valuable subsurface mineral deposits and more particularly for methods and apparatus for resolving two or more logs that are functions of a plurality of variable parameters that do not necessarily have known relative relationships existing therebetween.

Many instances arise in various fields of scientific measurement in which desired information cannot be obtained from recorded measurements of events since the recorded information is a function of two or more variable parameters that do not bear a specific or known relationship to one another. If it is possible to obtain a number of records equal to the number of variable paramenters, and if each of these records encompasses a different relationship between the paramenters, then at least some useful information may be extracted. In the special case where each record contains known relationships between the parameters, the rules relating to the solution of simultaneous equations may be applied to obtain the desired results. However, where such relationships between the paramenters have not been established, one must resort to other solutions if such exist.

There are many examples in the various fields of testing and measurement in which definitive relationships between various parameters cannot be established, and to which the present invention may be applied. For purposes of example, however, the present invention is decribed as apllied to problems in the field of geophysical exploration and, specificially, in the field of well logging. It is not intended to limit the scope of the invention to a specific field of measurements since the methods and apparatus set forth are of broad general applicability.

An example in the field of well logging in which two logs are obtained that are differently affected by two variable parameters bearing an unknown relationship to one another, is the logging procedure known as the "Microlog." It is desired to determine, by means of a Microlog, the resistivity of a flushed zone. Three electrodes are spaced one inch from one another along the axis of a well tool and resistivity logs are recorded indicating the resistivity between, for instance, the bottommost electrode and the uppermost electrode on the one hand and the bottommost electrode and the intermediate electrode on the other hand. Both of these curves are influenced by the resistivity and the thickness of the mud cake, which lies between the logging tool electrodes and the flushed zone, and also the resistivity of the flushed zone. The relative response of the two measurements and the recordings associated therewith are different to the two parameters even though neither of the measurements defines a definitive relationship therebetween.

Another example of a well logging measurement which provides two distinct measurements that are differently affected by two different paramenters, and in which a definitive relationship between the parameters is not known, is the chlorine log described in my patent application, Ser. No. 769,873 filed Oct. 27, 1958, now U.S. Patent No. 3,121,164, entitled "Geophysical Prospecting Method." A chlorine log may be obtained by running a neutron-gamma ray log together with a neutron-neutron log. The detectors employed in both of these logging methods are responsive to the presence of both hydrogen and chlorine but have different responses to the presence of chlorine and may have different responses to hydrogen, although, in the latter case, the difference between these two responses is known. Prior to the invention of the aforesaid U.S. patent, both of these curves were not normally run in logging a well since no method was known for obtaining more information relating to chlorine content from the two logs than was available from only one of these logs. The aforesaid U.S. patent presents two related methods for resolving the two logs to obtain more information relating to the chlorine content of various formations than was previously possible. In a first of these methods, the two logging curves are brought into depth correspondence. Thereafter, one of the curves is shifted with respect to its own zero intensity position and then the amplitude of one of the curves may be varied so as to obtain deflections equal to those of the other curve for all formations in which the amount of one of the particular elements, normally chlorine, is presumed to be constant. The two curves may thereafter be compared as by subtracting one from the other. If it is assumed that both adjustments of the curves are correct, it may be said that the curves are substantially matched with respect to hydrogen, and any departure from a matched condition represents a variation in the amount of chlorine.

Another method for resolving the two curves, as disclosed in the aforesaid patent, consists in plotting one of these responses as a function of the other. This may be accomplished either manually after the two logging curves have been recorded or automatically by means of a commercially available X-Y recorder. This method avoids the requirement for matching the deflections of the two curves but the method is very time consuming, and further, requires recordation on a point-by-point basis in order to keep track of the depth recorded by each point. Further, the desired information is not developed in the form of a log, plotted with respect to depth so that the informtion desired may be seen at a glance and compared visually with other logging records and therefore, does not readily lend itself to interpretation.

The two examples given above relates to the special case where two or more measurements are obtained and each of these measurements is affected by the same two parameters although the response is different to the two parameters under consideration. It is not intended to limit the present application to the resolution of curves bearing such a specific relationship to one another. The invention is of broader general applicability and may be employed to resolve two or more curves, each of which is responsive to a different single condition but which conditions are related to one another in accordance with a further quantity that is to be determined. As a specific instance of such a situation, reference is made to measurements intended to determine the hydrocarbon saturation of a porous subsurface stratum. It is assumed that in a porous structure the pores are completely filled by water or hydrocarbons or a combination of the two. Therefore, in all instances under this assumption, the sum of the water and hydrocarbon saturations is equal to unity. An acoustic log or a neutron log may be employed to determine the porosity of the stratum while an induction or a resistivity log may be employed to determine the conductivity or resistivity of the formation. The hydrocarbon saturation may be obtained by taking the ratio of the conductivity measurement (raised to a predetermined power) to the porosity measurement. The power to which conductivity is to be raised has been found to generally vary between the 0.43 and 0.56 power.

The above relationship is correct only if the porosity and conductivity or resistivity logs or records are brought into proper correlation. As in the examples given above, zero base and depth correlation may be obtained; and further, the amplitudes of the curves must be brought into correspondence to eliminate the factors relating to sensitivity scale of the various instruments at the time of recording. As indicated above, attempts to perform such correlation steps by the only methods known to the prior art; that is, by the methods disclosed in the aforesaid U.S. Patent No. 3,121,164, are time consuming and difficult.

It is an object of the present invention to provide a method and apparatus for resolving two or more functions or records, which method is rapid, accurate, and produces a record of the same general type as the original records from which the information is derived.

It is another object of the present invention to resolve the indications of two or more curves and to plot the resolved results in the form of one or more curves plotted against the same parameter as the original two or more curves.

It is still another object of the present invention to provide an apparatus which is capable of rapidly and automatically determining the relative magnitude of a variable parameter relative to a second variable parameter where definitive relationships between the parameters are not known.

In accordance with one aspect of the present invention, and reference is made particularly to a chlorine log for purposes of illustration and demonstration, the results of a neutron-neutron log and of a neutron-gamma ray log are recorded on a medium from which they may be readily reproduced, such as a magnetic tape. The tape or tapes on which the two logs are first recorded are played back and portions thereof are rerecorded on an endless tape or endless tapes. The position of the head on one of the endless tapes is moved so that the two heads scan the recorded information in depth correspondence, and those portions of the two tapes which do not have depth correspondence are erased. Each of the endless magnetic tapes is scanned repeatedly. The endless tapes are scanned over predetermined sections of the original record which correspond to predetermined depth intervals in the well. The signals derived from the playback of the endless tape are fed through bias and amplitude controls connected so as to adjust the zero levels of at least one of the signals and also to adjust the amplitude of at least one of the signals. Apparatus is provided for forming an instantaneous difference signal between the adjusted signals derived from the rerecorded signals. In the event that the signals are in the form of modulated carriers, it is necessary to demodulate each of the carriers prior to forming the difference signals. The average value or root-mean-square of the difference signal is obtained and integrated in a capacitor circuit having a time constant longer than the time required for one scan of the apparatus. An indicating device is employed to indicate the magnitude of the integrated difference signals and the bias and amplitude controls are manipulated until a minimum average difference signal is obtained. After obtaining a minimum reading of the integrated difference signal, the instantaneous difference signal is recorded as an indication of one of the quantities in the original logs and the sum signal may be recorded as indicative of the other quantity within the predetermined depth interval. The data on the endless tapes is then erased whereupon a different section of the original record may be rerecorded upon them and the process repeated.

Referring again to a chlorine log, the detectors both have a major response to hydrogen and a minor response to chlorine. If the difference between the signals is minimized, then it is apparent that the major responses of the two logs have been canceled out and that the only difference there-between is with respect to their minor responses. On the other hand, the sum signal minimizes the minor responses and provides an indication of the major responses.

The foregoing description refers only to systems employing two curves for the solution of two parameters and further, refers only to curves, whose major responses to at least one of the groups of variables are linearly related to one another. If the methods and apparatus of the present invention are to be employed with systems having more than two variable parameters, then a number of independent curves equal in number to the variable parameters must be operated upon. In such an operation, all of the channels except one must be provided with amplitude and bias controls and all average differences should be calculated with respect to the same curve. The recording and playback channel of this one curve does not require bias and amplitude controls since all other curves are adjusted to it.

As previously indicated, the two detectors may not have responses to the major parameter that are linear with respect to one another. For example, if the major responses of the two detectors employed in forming the curves of the multispaced neutron log to variations of porosity, rock composition and additional variables other than gas or vapor content are known to bear a 1.3 power law relationship to each other, then a non-linear network which approximates this relationship should be inserted in the signal channel associated with the proper one of the two curves. Alternatively, where the existing relationship is not known in advance, a variable non-linear network may be employed and the degree and type of non-linearity varied along with the bias and amplitude controls to obtain a minimum average value of the difference signal. With regard to the above method, it is preferable, although not mandatory, to determine the rms value of the difference signal rather than the average of the difference since the rms value gives more weight to the smaller differences in a set of random sized differences.

An additional feature of the present invention is that the signals employed may be digital rather than analog voltages as implied above. This has advantages in that it is often desirable in well logging telemetry to send information to the surface station in digital rather than in analog form and if the system of the present invention is made to operate upon digital signals then it is not necessary to convert to the analog form to utilize the apparatus of the present invention. Further, if the information transmitted is in digital form, then it is possible to apply the information directly to a high speed digital computer, which can be programmed in advance to perform automatically all of these successive operations enumerated above.

In accordance with another feature of the present invention, the apparatus may be employed to resolve two or more logs which are responsive to different parameters and wherein it is not possible to obtain from either log the desired information relating to a still further parameter. In the previous example relating to hydrocarbon saturation of porous formations, information relating to porosity of the stratum and the conductivity or the resistivity of the formation is obtained by conventional logging techniques. The apparatus of the present invention as set forth above; that is, the apparatus employed to produce maximum correlation by producing minimum meter deflection in response to an integrated difference signal between the logs, is again utilized to produce correlation between the records of the two independent measurements. Specifically, signals indicative of one of the records are shifted in time to produce depth correlation between the two functions and a variable D.C. bias is employed to produce zero base correlation. Also, the amplitude of this signal is varied so as to bring the amplitudes of the signals into maximum correspondence to eliminate sofar as feasible the effects of different sensitivity scales employed during recordation of the initial measurements. The aforesaid parameters are varied so as to produce minimum deflection of the meter connected to read the integrated difference between the two signals; and once this has been achieved, various other functions may be performed to obtain the desired information. In the specific example under consideration, the electric signals indicative of conductivity are rasied to a predetermined power; and the ratio of this latter signal to a signal indicative of porosity is computed by the apparatus to provide an indication of hydrocarbon saturation. If a resistivity log is employed in conjunction with an acoustic log, signals indicative of the resistivity are raised to the reciprocal of the same power as the signals indicative of conductivity in the prior example; and the product of the porosity signal and the resistivity signal raised to the power is computed to indicate hydrocarbon saturation. Porosity indications may also be obtained by neutron logs; but in such a case, the electric signal derived from the log is an exponential function of porosity. In order to obtain an indication of hydrocarbon saturation, the signals indicative of porosity must be applied to an exponential circuit so as to linearize the signals; and thereafter, the signals may be combined with either the conductivity or resistivity signals as indicated in the above examples.

It is seen from the above that, regardless of the type of signals being operated upon and regardless of the desired end result, the basic system for correlating various records is basically the same for all cases; and therefore, the methods and apparatus have a wide degree of flexibility, regardless of the type of operation being performed.

The apparatus of the present invention employed to practice the aforesaid methods may utilize a multichannel tape recorder having separate record and playback heads. The bias and gain or amplitude control circuits are quite simple and, respectively, may comprise a circuit for including a variable gain amplifier. The difference circuit may employ an analog adder and a polarity reversing circuit may be employed so that subtraction is effected by algebraic addition. The square law circuit, if one is required, may constitute a square law diode having a variable resistor inserted in series therewith and the circuit for producing the rms value of the difference signal may constitute a full-wave, bridge rectifier employing square law diodes. The full wave bridge rectifier supplies output signals to a capacitor storage circuit having a time constant which is approximately equal to or slightly longer than the time required to play back a length of tape on which the particular depth interval is recorded. It is seen that the individual circuits employed are quite simple and are completely conventional.

It is still another object of the present invention to provide a method and apparatus for resolving two or more measurement curves or records of measurements in which relatively simple and inexpensive equipment is employd to produce a highly accurate indication of the quantity to be measured.

It is another object of the present invention to provide a method and apparatus for rapidly and accurately resolving two or more logs to obtain information which is not readily available from either of the logs; which method and apparatus may be utilized by relatively unskilled personnel without a loss of accuracy.

The above and still further objects, features and advantages of the present invention will become apparent upon consideration of the following detailed description of one specific embodiment thereof, especially when taken in conjunction with the accompanying drawings, wherein:

FIGURE 3 is a schematic electrical wiring diagram of an apparatus which may be utilized for practicing the method of the present invention;

FIGURE 4 is a partial electrical schematic diagram which is a modification of the circuit of the type illustrated in FIGURE 3;

Figure 1:
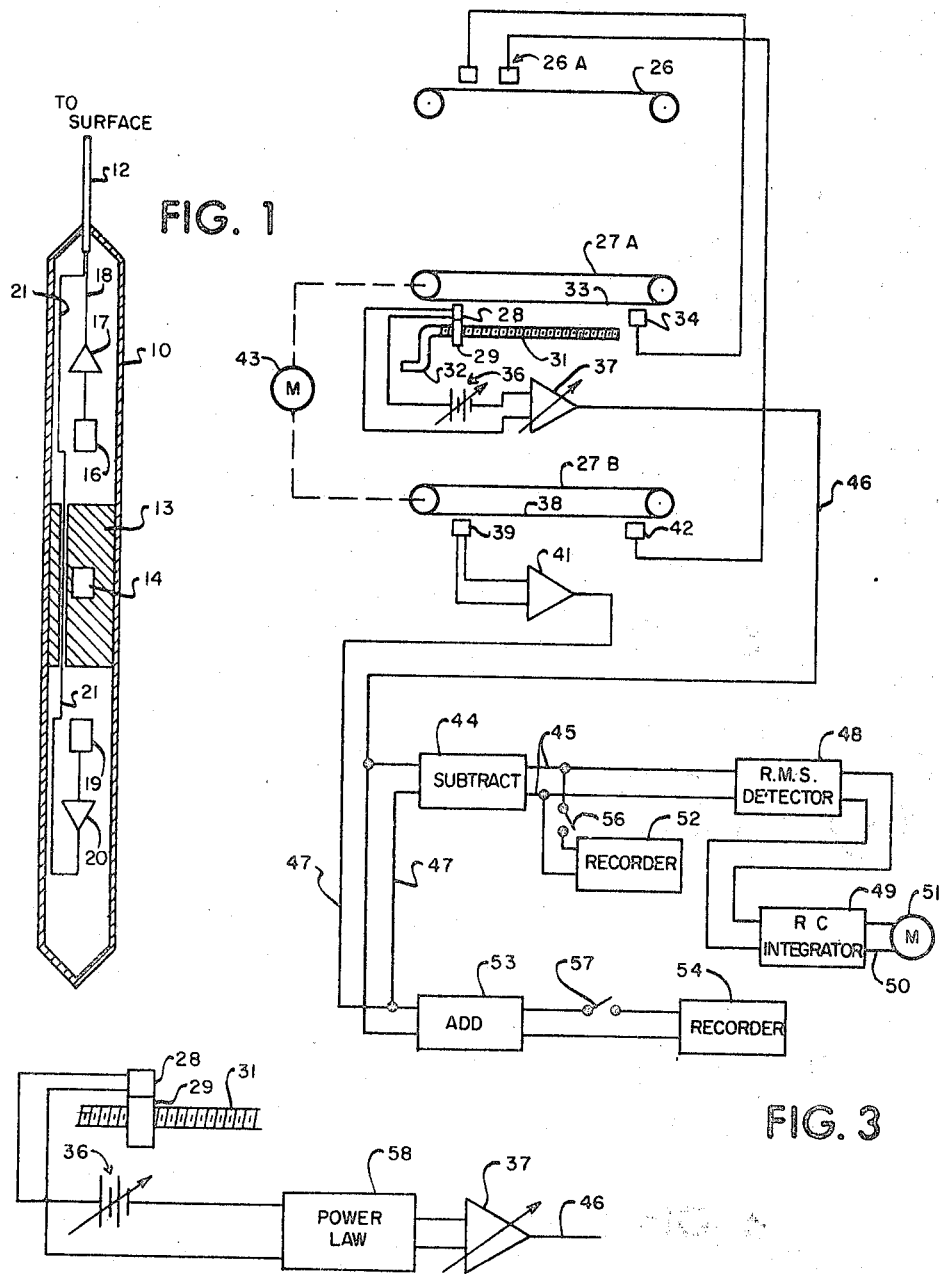
FIGURE 1 is a schematic illustration of a subsurface prospecting instrument employing a single neutron source and two detector-amplifier assemblies.

Referring now specificaly to FIGURE 1 of the accompanying drawings, the numeral 10 designates the outer casing of the well surveying equipment raised and lowered within a well bore by means of a cable 12. A suitable source of neutrons 14 is disposed within the well tool casing 10 and is situated within a heavy shield 13 for purposes which are well known to those skilled in the art. A gamma-ray-sensitive detector 16 is provided above the source 14, it being unimportant whether it is disposed above or below the source, and output pulses developed by the detector 16 in response to gamma rays are amplified by an amplifier 17. The amplifier 17 develops output pulses or other forms of voltage information on a lead 18 which forms a part of the cable 12 from which the tool 10 is suspended. A neutron detector 19 is disposed below the source 14 and applies electrical pulses to an amplifier 20 which feeds a lead 21, also constituting a lead of the cable 12. Other arrangements of the source 14, detectors 16 and 19 may be employed and conform to the various configurations illustrated and described in the aforesaid Patent No. 3,121,164.

If the apparatus is to be employed to examine the chlorine content of subsurface formations, the response of the detectors must be different with respect to chlorine and, as previously indicated, this is achieved by employing a gamma ray detector and a neutron detector so as to obtain concurrently a neutron-neutron log and a neutron-gamma ray log. The detector 19 which is responsive to neutrons may take several forms known to the art and, for example, may constitute a counter tube containing boro trifluoride gas. The detector 16 which is responsive to gamma radiation may constitute an ionization chamber containing argon gas or may also be a Geiger tube containing argon together with a suitable quenching gas. In this specific example, the two detectors are similarly responsive to the presence of hydrogen and are oppositely responsive to the presence of chlorine. Specifically, the amplitude of the output signal from the detector 19 decreases in the presence of chlorine while the output signal from the detector 16 increases in the presence of chlorine, while the output signal from both detectors decreases when the hydrogen content of the surrounding rocks increases.

Figure 2:
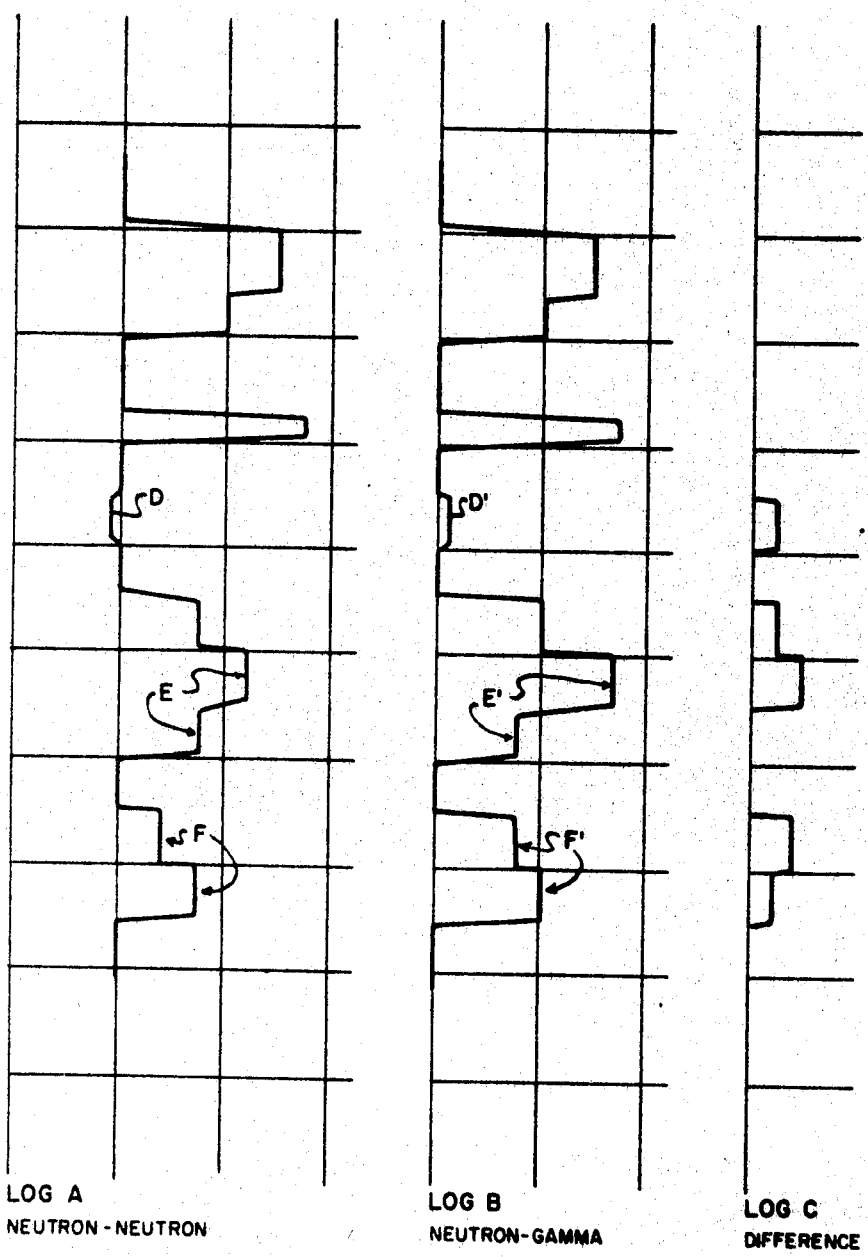
FIGURE 2 illustrates logs made in accordance with the method of the present invention.

Referring now specifically to FIGURE 2 of the accompanying drawings, there is illustrated in a log A which indicates the response of the neutron detector 19 over a given region of a well while the log B represents the response of the detector 16 over the same depth interval of a well. It will be noted that the response of the two curves has substantially the same shape except at the locations D, D', E, E', and F, F' on logs A and B respectively. It is seen, and reference is now made to log C of FIGURE 2, that if the amplitude of the log A is increased by a proper amount and its zero position is shifted, the log A can be superimposed on the log B except at the specific locations mentioned above. Therefore, in those regions where the curves are superimposed, the response of the two detectors is substantially identical, indicating a constant amount of chlorine in these regions. However, where the two curves are not superimposed, then the response of the detectors is not the same and a variation in the chlorine content of the region is indicated.

The curves of the logs A and B of FIGURE 2 are greatly simplified and it is well known to anyone skilled in this art that such clear and easily-read curves are not normally obtained as the result of a well logging operation. In the explanatory curves, the operations required to produce superposition of the logs A and B is quite apparent but in a practical case, the amount of amplification and the amount of shift in zero position required of one curve with respect to the other to produce superposition would not be readily apparent.

It is therefore the primary purpose of this invention to provide a method and apparatus for producing the best correspondence between any two or more curves so as to obtain maximum superposition of the curves as represented by log C so that the areas of difference may readily be examined.

Referring now specifically to FIGURE 3 of the accompanying drawings, there is illustrated a schematic circuit diagram of an apparatus which may be employed for carrying out the specific steps of the method of the present invention as previously outlined. Specifically, there is provided a first recording mechanism generally designated by the referenec numeral 26 and a second pair of recording mechanisms designated by the reference numerals 27a and 27b. Recording mechanisms 27a and 27b may, and preferably do, take the form of endless magnetic tapes and preferably constitute a single multichannel recording mechanism, although two distinct mehcanisms are illustrated for purposes of clarity. Further, at least one head of the second pair should be shiftable so as to bring the two recording mechanisms into depth correspondence.

Specifically, the mechanism 26 is provided with a multichannel playback head 26a, each channel of which is employed to rerecord on one of the endless tapes through the erase-record heads 34 and 42. The mechanism 27a is provided with a playback head 28 having a follower nut 29 positioned on a lead screw 31 so that, by turning a crank 32 attached to the lead screw 31, the head 28 may be translated with respect to the recording medium which takes the form of an endless magnetic tape 33. The output circuit of head 28 includes a variable bias circuit 36 and a variable gain amplifier 37. The variable bias circuit 36 is schematically illustrated as a variable battery although, obviously, other forms of variable bias circuits may be employed.

The recording apparatus 27b includes an endless magnetic tape 38, a playback head 39, a fixed gain amplifier 41 to which the signals from the playback head 39 are fed. The recorders 27a and 27b receive their mechanical power from an electric motor 43 employed to drive the two recording mechanisms 27a and 27b in synchronism. The output voltage from the amplifier 37 is also applied to a subtract circuit 44 via a lead 46 as is the output voltage from the amplifier 41 which is applied to the subtract circuit via a lead 47. The output voltage from the substract circuit 44 is fed via leads 45 to a circuit 48 for producing a voltage equal to the root-mean-square of the difference voltage produced by the circuit 44. The voltage from circuit 48 is integrated by the RC network 49 and is fed via a pair of output leads 50 to an indicating meter 51. In operation, the controls for the lead screw 31, the variable bias source 36, and the variable gain amplifier 37 are manipulated so that a minimum reading is obtained by the meter 51. In this particular application this means that the playback heads 28 and 39 of the mechanisms 27a and 27b are reading portions of their respective curves which were logged at the same depth, that the zero bases and amplitudes of the two curves have been so adjusted that the major responses where no chlorine variations occur have been brought into concurrence. At this time the meter 51 has a minimum reading and the maximum correlation between the two curves has been achieved. Upon completion of the manipulation whereby the minimum reading of the meter 51 is obtained the switch 56 is closed for one complete cycle of the endless tapes 33 and 38 and the instantaneous difference signal produced on the leads 45 is rerecorded on the recorder 52. The record made by recorder 52 is a curve, plotted against depth, representative of the section of the well recorded on the endless tapes 33 and 38, which to an extremely close approximation indicates only the variations in chlorine content and provides an indication of the relative quantities of chlorine present in these different regions. As soon as this section of the well has been recorded by the recorder 52, the switch 56 is opened and the recorder 52 stopped temporarily. The endless tapes 33 and 38 are then erased by action of the erase-record heads 34 and 42 which are next used to re-record data from another section of the tape 26 on to the endless tapes 33 and 38. The cycle is repeated again and again until all of the zones of interest recorded on the original record on the tape 26 have been transcribed in modified form into the recorder 52. The record accumulated by the recorder then represents the chlorine variations throughout all the zones of interest.

Since the two detectors 16 and 19 are affected oppositely by the presence of chlorine, if the two curves recorded on the tapes 32 and 38 are added, then the chlorine responses are opposed while the hydrogen responses are added and a resulting graph is indicative almost entirely of hydrogen content. This may be accomplished in accordance with the method and apparatus of the present invention by alplying the voltages appearing on the leads 46 and 47 to an adder circuit 53, the output voltage of which is supplied to an appropriate recorded 54. The circuit of the recorder 54 is also provided with a switch 57 so that information is recorded only when the desired results have been obtained; that is, only after the meter 51 reads a minimum.

It was previously indicated that the response of the detectors 16 and 19 may not be the same with regard to the major parameter; namely hydrogen. In specific cases, it has been found that the relative responses of the two detectors described above with respect to hydrogen are related by the 1.3 power. Other types of detectors are not related exactly in the same way but it is known that in most of these detectors the exponent of the relationship lies between 1 and 2. In accordance with the present invention, and reference is now made to FIGURE 4 of the accompanying drawings, wherever the major responses of the instruments are not linearly related a power law circuit 58 may be employed in the recording mechanism 27a between the variable bias circuit 36 and variable gain amplifier 37. The manipulations now required to produce a minimum indication by the meter 51 involves 4 distinct operations, relating to amplitude, power law, bias or zero base, and depth correlation.

Figure 5:
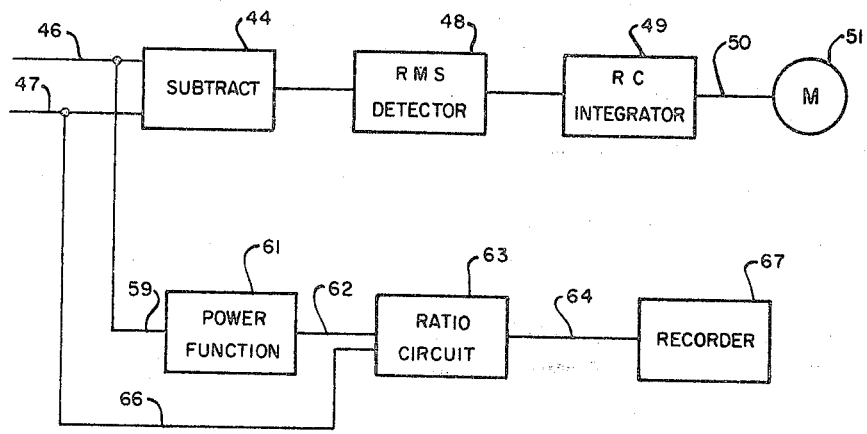
FIGURE 5 is an electrical schematic block diagram of one system for determining the hydrocarbon saturation of subsurface formation.

Referring now specifically to FIGURE 5 of the accompanying drawings, there is illustrated a system for determining the hydrocarbon saturation of a subsurface formation in which the various signals applied to the system relate to porosity of subsurface formation and the conductivity thereof. In the example illustrated, the porosity is determined by an acoustic log; and the conductivity may be determined by an induction log. Those elements which correspond to elements illustrated in FIGURE 3 of the accompanying drawings bear the same reference numerals as in the prior figure. The signals indicative of the conductivity log appear on the lead 46 while those relating to porosity appear on the lead 47. The signals are applied to a subtraction circuit 44 after which the difference between the two signals is applied to an rms detector 48 and thence to an RC integrating circuit 49. The output signals from the integrating circuit 49 are applied via a lead 50 to a meter 51. The various controls for zero bias, depth correspondence and amplitude as illustrated in FIGURE 3 are employed to minimize the reading of the meter 51.

The signals appearing on the lead 46 are also applied via a lead 59 to a power function circuit 61 and thence via a lead 62 to a circuit 63 for producing a signal on its output lead 64 indicative of the ratio between two quantities. The power function circuit 61 may raise the signals indicative of conductivity appearing one the leads 46 and 59 to a power between 1.8 and 2.3, depending upon the region in which the test is being made. The signals on the lead 47 indicative of porosity are applied via a lead 66 to a second input circuit of the ratio circuit 63 so that the signals appearing on the output lead 64 are indicative of the ratio of the conductivity (raised to a predetermined power) to the porosity signals. The signals appearing on the lead 64 may be recorded by a tape or other suitable recorder 67.

It will be noted that the basic circuits for obtaining correlation between the two functions are identical with those illustrated in the previous examples, hereby indicating the high degree of utility of the system of the present invention in resolving two or more curves to obtain information not obtainable by either of the curves independently.

Figure 6:
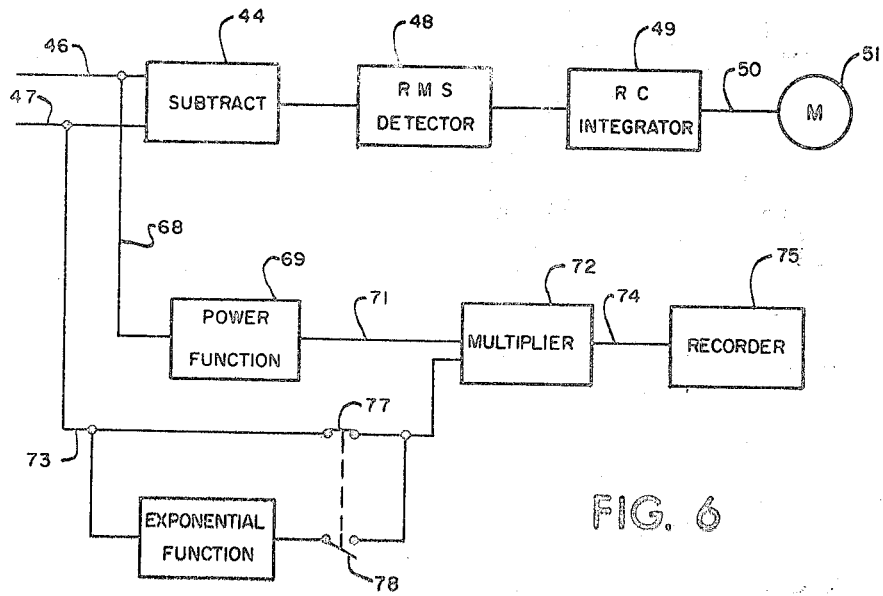
FIGURE 6 is an electrical schematic block diagram of another system for determining the hydrocarbon saturation of a subsurface formation.

Referring now to FIGURE 6 of the accompanying drawings, there is illustrated a circuit for determining hydrocarbon saturation of a subsurface formation when the system is provided with information relating to porosity and resistivity. The signals indicative of resistivity of the formaton appear on the lead 46, while those indicative of porosity appear on the lead 47. These signals are applied to the subtraction circuit 44 and thence to the RMS circuit 48, RC integrating circuit 49 and meter 51. The amplitude, zero position and depth correspondence controls are again manipulated to produce a minimum reading at the meter 51. The resistivity signals appearing on lead 46 are applied via a lead 68 to a power function circuit 69 which raises the signals to the same power as the power function circuit 61 in FIGURE 5. The circuit 69 develops output signals on the lead 71 connected to an input circuit of a multiplying circuit 72. The porosity signals appearing on the lead 47 are coupled via the lead 73 to a second input circuit of the multiplying apparatus 72 which produces product signals on an output lead 74. The signals appearing on the lead 74 may be recorded by recorder 75 only after the reading of the meter 51 is minimized.

If the porosity measurement is obtained by a neutron log rather than an acoustic log, the signals appearing on the lead 47 are related to the porosity in accordance with an exponential function. In order to linearize this function, the apparatus of FIGURE 6 and also the apparatus of FIGURE 5 may be provided with an exponential function circuit 76. The lead 73 may have a switch 77 connected therein while the exponential function circuit 76 is coupled between the lead 47 and the multiplier 42 by means of a switch 78. The switches 77 and 78 may be mechanically ganged so that when one is open the other is closed. Therefore, if an acoustic log is employed to determine porosity, the switch 77 is closed and the switch 78 is open so that the signals appearing on the lead 47 are coupled directly to the multiplier circuit 72. On the other hand, if porosity has been determined by a neutron log, the switch 77 is opened, the switch 78 is closed and the signals appearing on the lead 47 are linearized before being applied to the multiplying circuit 72.

The example of operation of the method and apparatus of the present invention given above has been restricted to a system having only two variable parameters. As stressed previously, the methods and apparatus of the invention are not restricted to a system of only two logs, since obviously, if a number of distinct relationships can be obtained equal to the number of variable parameters involved, any system of curves may be correlated by the methods and apparatus set forth. Further, the specific apparatus illustrated is not intended to be limiting or to illustrat even the best possible circuitry for performing the method of the invention, since many variations thereon would be immediately apparent to one skilled in the art. Obviously, the recorders 52 and 54 may take many forms such as magnetic tape recorders or chart recorders or they may be dispensed with by employing a multichannel instrument for recording all channels of the various curves, including the original curves. Further, other types of recording and playback apparatus may be employed and it is not intended to limit the apparatus to magnetic recorders. The subtraction and addition circuits may take the form of analog circuits if analog information is recorded or may take the form of less conventional subtraction and addition circuits if the information is recorded in digital form.

While I have described and illustrated one specific embodiment of my invention, it will be clear that variations of the details of construction which are specifically illustrated and described may be resorted to without departing from the true spirit and scope of the invention.

What is claimed is:

1. An apparatus for resolving a plurality of records comprising:
　at least two endless recording channels,
　a recording and playback transducer associated with each of said recording channels, said recording transducers including means for erasing previously recorded information,
　circuit means interconnecting each of said recording transducers with its associated playback transducers so as to rerecord the previously recorded information,
　one of said circuit means associated with one of said playback transducers comprising controllable means for varying the DC level and the amplitude of the reproduced signals,
　means for producing an electric quantity equal to the difference between the reproduced signals,
　operational means for at least integrating the electric quantity, and
　means for recording the electric quantity.

2. The combination according to claim 1 wherein said operational means produces the integrated root-mean-square value of said electric quantity.

3. The combination according to claim 1 further comprising means for producing the sum of the reproduced signals and means for recording the sum signals.

4. The combination according to claim 1 wherein said one of said circuit means further comprises means for operating upon said signal in accordance with a power law function.

5. The combination according to claim 1 wherein said one of said circuit means further comprises means for operating upon said signal in accordance with a predetermined non-linear function.

6. A method of geophysical prospecting within a borehole comprising:
　making a plurality of logs of variable information relating to the earth formation surrounding said borehole at substantially the same depth in the borehole;
　measuring the integrated difference signal between first and second electric quantities indicative of at least two of the logs;
　varying said first electric quantity, in order to produce a minimum integrated difference signal; and
　forming a product of the electric quantities.

7. A method of geophysical prospecting within a borehole comprising:
　making a plurality of logs of variable information relating to the earth formation surrounding said borehole at substantially the same depth in the borehole;
　measuring the integrated difference signal between first and second electric quantities indicative of at least two of the logs;

varying said first electric quantity, in order to produce a minimum integrated difference signal;

operating upon said first electric quantity in accordance with a predetermined function to produce a further electric quantity; and producing a product function of said second and said further electric quantities.

8. A method of geophysical prospecting within a borehole comprising:

making a plurality of logs of variable information relating to the earth formation surrounding said borehole at substantially the same depth in the borehole;

measuring the integrated difference signal between first and second electric quantities indicative of at least two of the logs;

varying said first electric quantity in a first circuit in order to produce a minimum integrated difference signal, operating upon said first electric quantity in a second circuit in accordance with a predetermined function to produce a further electric quantity, and producing a product function of said second and said further electric quantities.

9. The combination according to claim 8 wherein:

said first electric quantity is derived from an induction log of a subsurface formation under study and is proportional to the conductivity of the subsurface formation;

said second electric quantity is derived from an acoustic log of the subsurface formation and is proportional to the porosity of said formation;

the non-linear function is a power function equal to approximately the 0.43 to 0.56 power; and the product function is the ratio of the second electric quantity to the further electric quantity.

10. The combination according to claim 8 wherein:

said first electric quantity is derived from a resistivity log of a formation;

said second electric quantity derived from an acoustic log and is proportional to the porosity of said formation;

the non-linear function is a power function equal to approximately the 1.8 to 2.3 power; and the product function is derived by multiplying said second and further electric quantities.

11. The combination according to claim 8 wherein:

said first electric quantity is derived from an induction log of a subsurface formation under study and is proportional to the conductivity of the subsurface formation;

said second electric quantity is derived from a neutron log of the subsurface formation and is proportional to the porosity of said formation;

the non-linear function is a power function equal to approximately the 0.43 to 0.56 power;

operating upon the second electric quantity in accordance with an exponential function to produce another further electric quantity; and wherein the product function is the ratio of the second further electric quantity to the further electric quantity.

12. The combination according to claim 8 wherein:

said first electric quantity is derived from a resistivity log of a subsurface formation under investigation;

said second electric quantity is derived from a neutron log of the subsurface formation and is proportional to the porosity of said formation;

the nonlinear-function is a power function equal to approximately the 1.8 to 2.3 power operating upon the second electric quantity in accordance with an exponential function to produce another further electric quantity; and wherein the product function is derived by multiplying said second and further electric quantities.

References Cited

UNITED STATES PATENTS

| | | | |
|---|---|---|---|
| 2,659,014 | 11/1953 | Scherbatskoy | 340—18 |
| 2,911,536 | 11/1959 | Scherbatskoy | 250—83.6 |
| 2,971,094 | 2/1961 | Tittle | 250—83.6 |
| 3,205,347 | 9/1965 | Wright | 235—193.5 |
| 3,121,164 | 2/1964 | Swift | 250—83.6 |
| 3,281,773 | 10/1966 | Newman | 340—18 XR |
| 3,336,476 | 8/1967 | Richardson | 250—83.6 XR |
| 2,928,071 | 3/1960 | Feagin et al. | |

EUGENE G. Botz, Primary Examiner

U.S. Cl. X.R.

235—151, 151.35, 183, 193.5; 250—83.3